(12) United States Patent
Beck

(10) Patent No.: US 7,635,051 B2
(45) Date of Patent: Dec. 22, 2009

(54) SUSPENSION SYSTEM FOR MOTOR VEHICLES

(75) Inventor: Hubert Beck, Eitorf (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 511 days.

(21) Appl. No.: 11/179,270

(22) Filed: Jul. 12, 2005

(65) Prior Publication Data

US 2006/0013717 A1    Jan. 19, 2006

(30) Foreign Application Priority Data

Jul. 15, 2004    (DE) ................ 10 2004 034 106

(51) Int. Cl.
*F16F 9/54* (2006.01)
(52) U.S. Cl. ................ 188/322.2; 188/322.21; 188/322.19; 267/64.16; 267/64.17
(58) Field of Classification Search ................ 188/315, 188/322.2, 322.19, 322.21; 267/64.16, 64.17; 60/477; 280/5.514, 6.157
See application file for complete search history.

(56) References Cited

U.S. PATENT DOCUMENTS

| | | | | |
|---|---|---|---|---|
| 4,993,693 A * | 2/1991 | Lohr et al. | ................ | 267/64.17 |
| 6,474,629 B2 * | 11/2002 | Beck et al. | ................ | 267/64.16 |
| 6,494,441 B2 * | 12/2002 | Beck et al. | ................ | 267/64.16 |
| 6,553,761 B2 | 4/2003 | Beck | | |
| 7,118,099 B2 * | 10/2006 | Beck | ................ | 267/64.17 |
| 7,306,079 B2 * | 12/2007 | Beck | ................ | 188/322.2 |
| 7,344,127 B2 * | 3/2008 | Beck | ................ | 267/64.17 |

* cited by examiner

*Primary Examiner*—Robert A Siconolfi
*Assistant Examiner*—Mariano Sy
(74) *Attorney, Agent, or Firm*—Cohen Pontani Lieberman & Pavane LLP

(57) ABSTRACT

A suspension system for motor vehicles with a level control for adjusting a predetermined height of the vehicle body is configured with at least one piston-cylinder unit which is provided with a work cylinder, a piston rod and a damping piston having damping valves, a pump of an oil reservoir, corresponding inlet lines and outlet lines from the oil reservoir, and corresponding inlet lines and outlet lines from the oil reservoir to the piston-cylinder unit, and vice versa, and the pump is configured with a pump piston and a drive unit. The piston-cylinder unit and the pump are constructed as separate subassemblies which are manufactured independently beforehand, and at least the piston-cylinder unit is filled with damping medium before the two subassemblies are mounted.

8 Claims, 5 Drawing Sheets

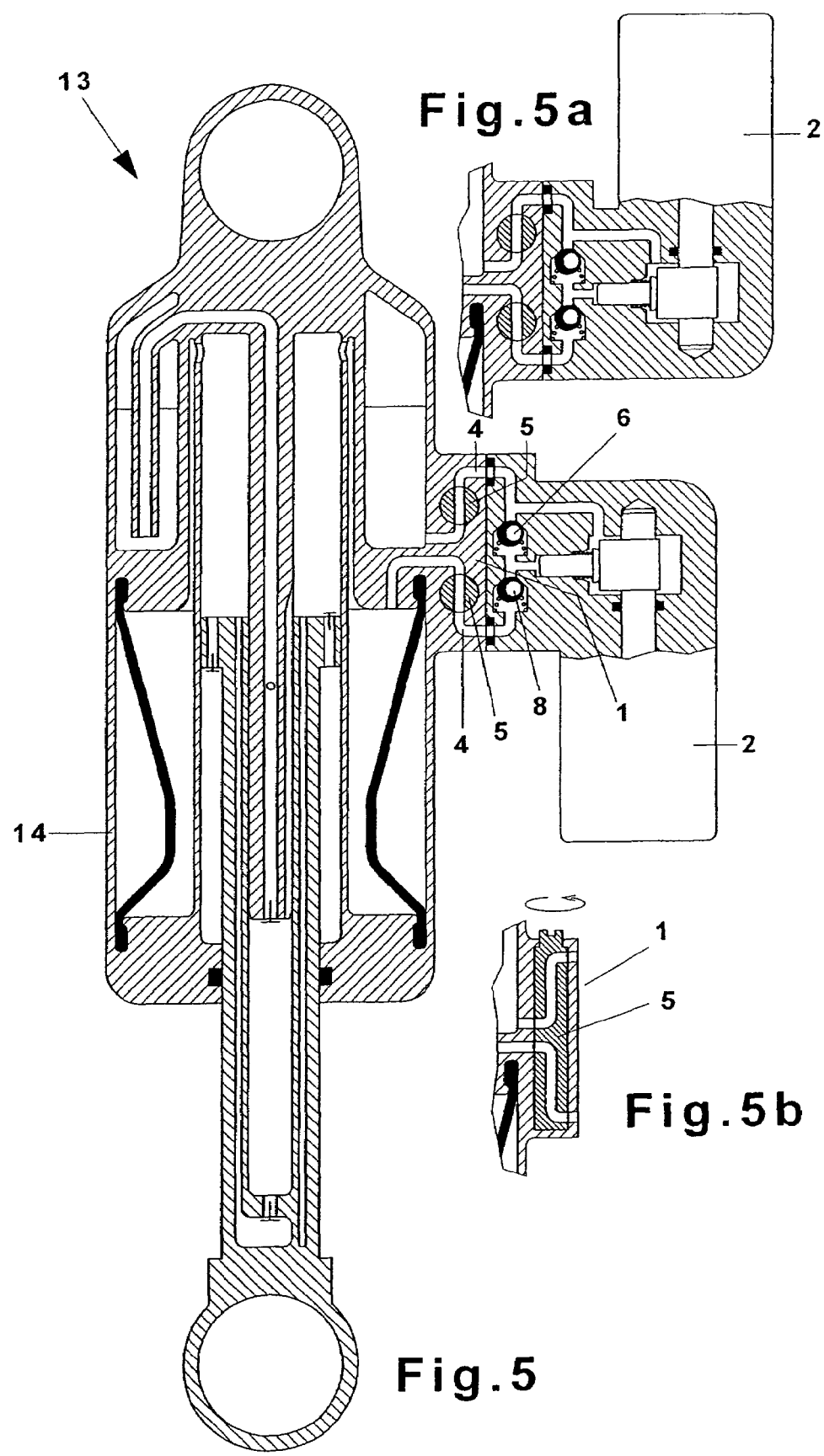

SUSPENSION SYSTEM FOR MOTOR VEHICLES

BACKGROUND OF THE INVENTION

1. Field of the Invention

The invention is directed to a suspension system for motor vehicles with a level control for adjusting a predetermined height of the vehicle body.

2. Description of the Related Art

Suspension systems for motor vehicles in which a level control is provided for adjusting a predetermined height of the motor vehicle body are already known (see, for example, U.S. Pat. No. 6,553,761). This suspension system with level control has a height regulating drive unit which is flange-mounted laterally and which can be controlled and sensed electrically. This system has a pump rod or is constructed without a pump rod as a spring cylinder. The spring cylinder construction is controlled externally by sensors and electronics. An outlet valve is additionally required for this purpose. Both constructions have the disadvantage that the height regulating drive unit must be flanged on during manufacture of the device for reasons of tightness, which impedes the manufacturing process. A further drawback is that this height regulating drive unit must be covered in a time-consuming manner before the piston-cylinder unit is painted or must not be exposed to temperatures during the drying process following the painting process beyond a reasonable extent.

SUMMARY OF THE INVENTION

Therefore, it is the object of the invention to provide a suspension system with level control in which a height regulating drive unit does not negatively affect the overall unit with regard to manufacture during the production of the piston-cylinder unit.

This object is met in that the piston-cylinder unit and the pump are constructed as separate subassemblies which are manufactured independently beforehand, and at least the piston-cylinder unit is filled with damping medium before the two subassemblies are mounted.

It is advantageous that the suspension system is produced initially without the height regulating drive unit and is not connected to the height regulating drive unit until after the final assembly, that is, after the processes of washing, painting and drying the piston-cylinder unit.

Another advantage consists in that it is also possible to exchange a possible defective height regulating drive unit during subsequent driving operation without affecting the operation of the suspension system.

The piston-cylinder unit preferably has a base for attachment of the pump.

In an advantageous embodiment, the base is provided with blocking members which close off the interior of the piston-cylinder unit relative to the atmosphere. In an advantageous manner, at least one check valve and/or closure member are/is provided as a blocking element. The use of check valves or blocking members ensures that no damping medium can exit from the piston-cylinder unit on the low-pressure side. Accordingly, the piston-cylinder unit can be filled beforehand so that the height regulating drive unit can be flanged on in the form of a completely preassembled pump after final assembly.

According to another embodiment, the base is provided with at least one rotary slide and the housing of the pump is provided with check valves. In this regard, it is advantageous that blocking members in the form of closure members are associated with the piston-cylinder unit and that the height regulating drive unit in the form of the pump is provided with check valves so that the two subassemblies can be filled with damping medium beforehand and the slight amount of air in the system following assembly is dissolved by the high pressure of the damping medium.

In another advantageous embodiment, the piston-cylinder unit and the pump can each be tested individually for operability.

Under certain operating conditions and for reasons relating to space in the vehicle, it is advantageous that the pump can be arranged at the base in more than one position.

In another embodiment, the base is fixedly, but detachably, connected to the piston-cylinder unit.

The base is preferably a component part of an outer tube of the piston-cylinder unit.

In another embodiment, an element above which extends the flow connection from the pump to the oil reservoir is arranged between the outer tube and the work cylinder.

Further, an element through which the flow connection coming from the pump extends into the high-pressure chamber is arranged between the outer tube and the work cylinder.

Examples of preferred embodiments of the invention are shown schematically in the drawings.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

FIG. 2 shows a sectional view of the piston-cylinder unit of FIG. 1 coupled to the pump of FIG. 1a;

FIG. 5 shows an embodiment of a piston-cylinder unit in which the check valves are associated with the pump.

FIG. 5a shows an embodiment of mounting the pump to the piston-cylinder unit; and FIG. 5b shows a flow connection unit in which a closure member is constructed as a rotary slide.

DETAILED DESCRIPTION OF THE PRESENTLY PREFERRED EMBODIMENTS

Figures 1, 1A:
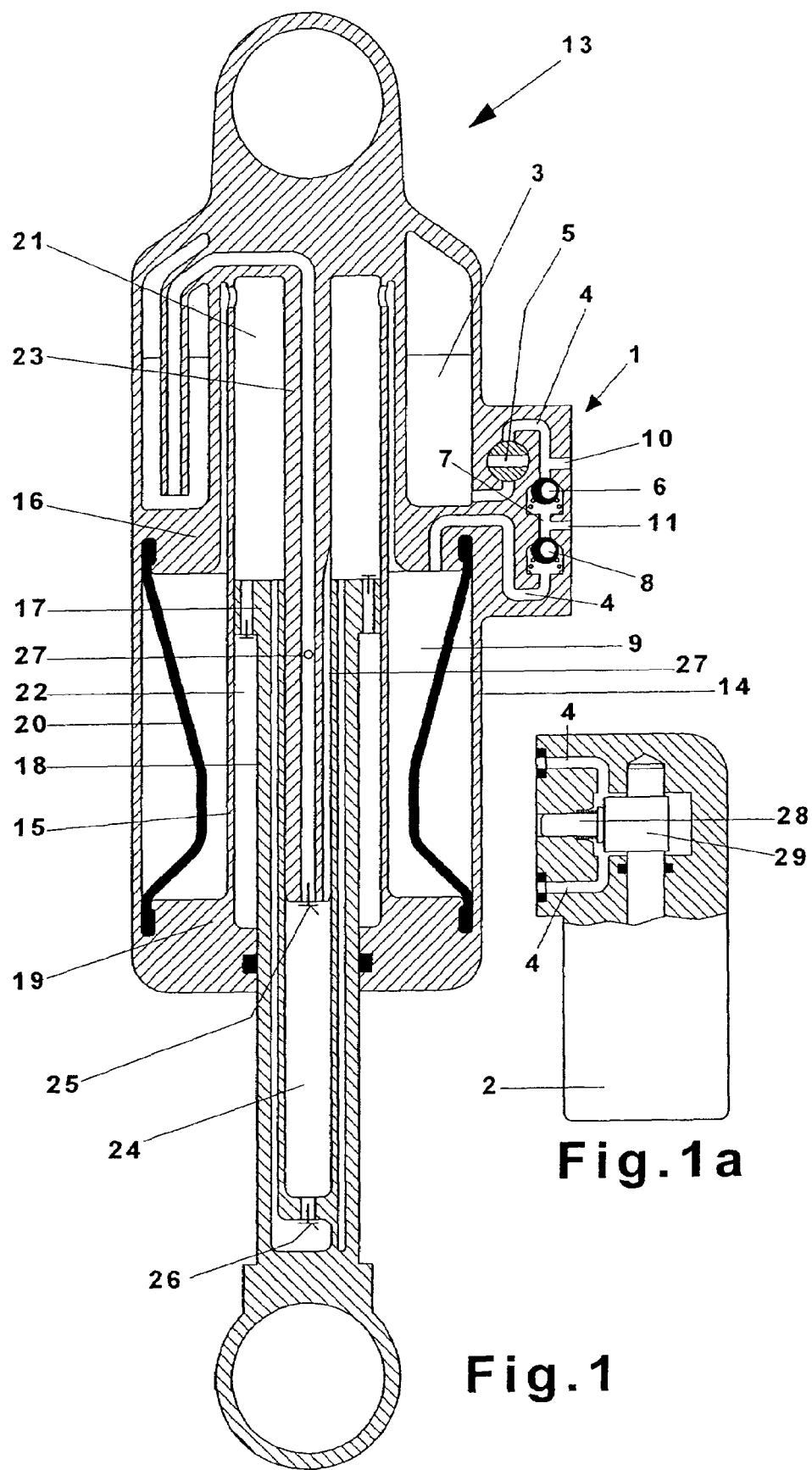
FIG. 1 shows a sectional view of a piston-cylinder unit.
FIG. 1a shows a sectional view of a pump.

Referring to FIG. 1, the piston-cylinder unit is constructed as a self-pumping hydropneumatic spring strut for motor vehicles and substantially comprises the work cylinder 15 in which a damping piston 17 slides at the end of a hollow piston rod 18. The work cylinder 15 is closed on one side by an end wall and on the other side by the rod guide 19 through which the hollow piston rod 18 moves outward in a sealed manner. In a manner not shown in the drawing, the spring strut is fastened to the body of the vehicle above the end wall by means of a fastening lug and at the lower end of the spring strut the piston rod 18 is fastened to the axle of the vehicle by means of another fastening lug. The work cylinder 15 is enclosed by an annular compensation chamber which is filled partly with oil and partly with gas and which is divided by an intermediate wall 16 into a high-pressure chamber 9 and a low-pressure chamber 3. A high-pressure gas cushion in the high-pressure chamber 9 is separated from an oil space by a dividing wall 20. Oil and a low-pressure gas cushion are not separated from one another inside the low-pressure chamber 3. The pressure in the low-pressure chamber 3 is the same as that in the high-pressure chamber 9 in the fully governed state, i.e., when not pumping at high speed.

The low-pressure chamber 3 and the high-pressure chamber 9 are connected to the work cylinder 15. The work cylinder 15 is divided by the damping piston 17 into two work spaces 21 and 22. The damping piston 17 has damping valves for the rebound stroke and compression or bump stroke.

The actual level control of the self-pumping hydropneumatic spring strut is carried out by means of the pump rod 23 which, together with the hollow space of the piston rod 18, forms a level control pump 24. By means of an inlet valve 25 and an outlet valve 26, damping medium is guided out of the low-pressure chamber 3 past the inlet valve 25 and outlet valve 26 into the work spaces 21 and 22 during driving operation of the vehicle by the relative movement of the pump rod 23 with respect to the piston rod 18. The damping piston 17 is moved outward until the bypass 27 produces a connection between the level control pump 24 and the work space 21.

The pumping action of the level control pump 24 is stopped at this point and the dynamic height level of the vehicle is adjusted. When the vehicle is unloaded, the damping piston 17 is initially pushed out again by the pressurized gas in the high-pressure chamber 9 until the regulating bore 27, which is now open, brings about a pressure equilibrium in the piston-cylinder unit 13 whereby the piston rod 18 is subsequently pushed inward with the damping piston 17.

As shown in FIGS. 1 and 1a, the outer tube 14 is provided with a base 1 to which the pump 2 is flanged. Inside the base 1, a flow connection 4 proceeding from the low-pressure chamber 3 to a low-pressure connection 10 is provided with a closure member 5, e.g., in the form of a rotary slide in the present case, for blocking the low-pressure chamber 3. Another flow connection 4 extending in intermediate wall 16 from the high-pressure chamber 9 is provided with a check valve 8 in the direction of the pump space connection 11. The flow connection 4 which extends from the low-pressure chamber 3 to the pump space connection 11 is outfitted with a check valve 6. The check valves are formed as balls with corresponding springs. The pump 2 has additional flow connections 4 in its housing which are compatible with the flow connections 4 of the base 1. The center bore of the pump 2 has a pump plunger 28 which is driven by an eccentric cam 29. The cam 29 is set in rotation by an electric motor arranged in the pump 2 and moves the pump plunger 28 in axial direction so that a corresponding pressure is moved past the check valve 8 into the high-pressure chamber 9 via the pump space connection 11 of the base 1. The space between the two check valves 6 and 8 serves as pump space 7.

Figure 2:
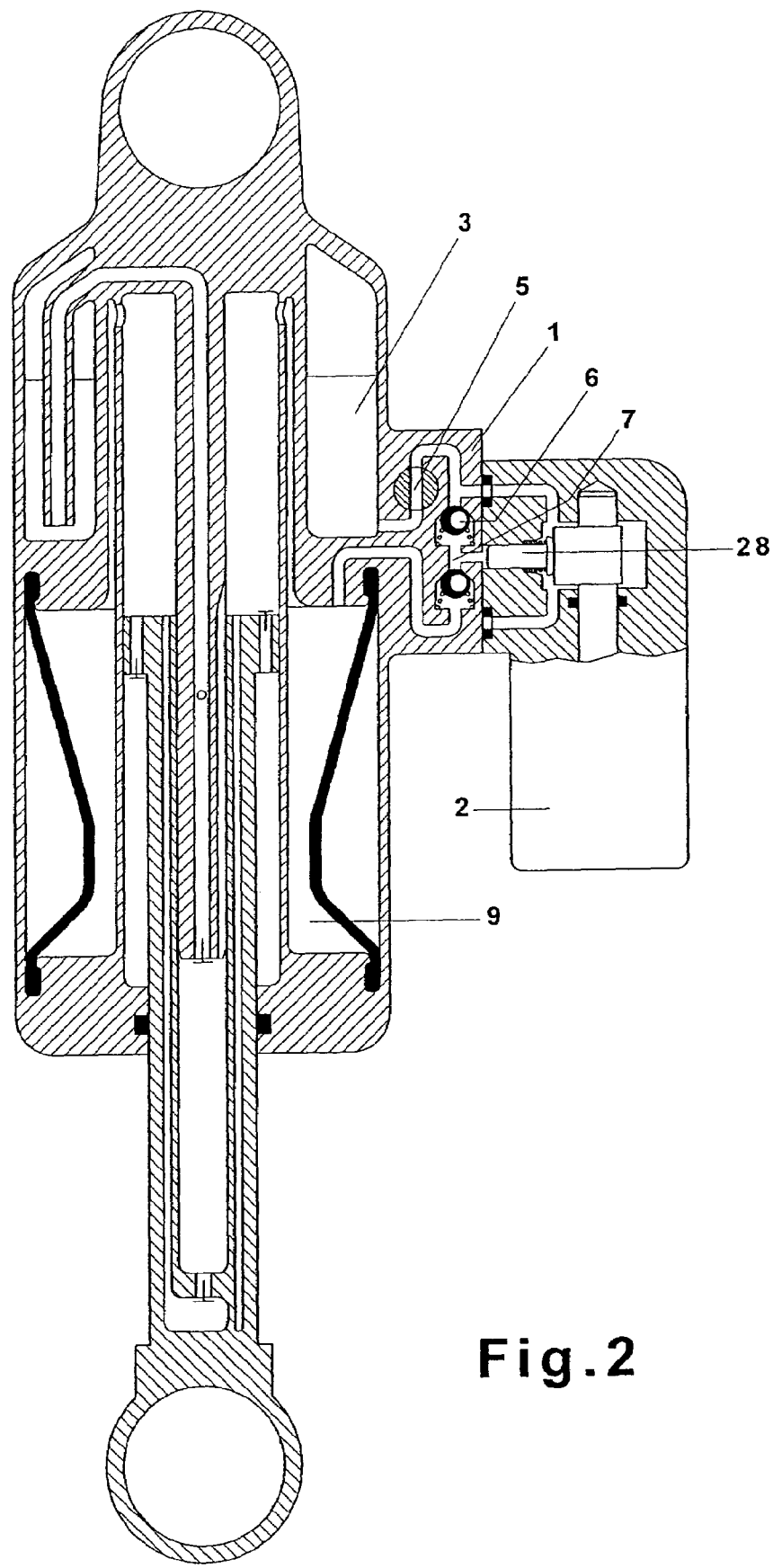

FIG. 2 shows an embodiment in which the closure member 5 of the base 1 is in the open position so that the damping medium can travel from the low-pressure chamber 3 past the closure member 5 and into the pump space 7 past the check valve 6. The damping medium is conveyed along this path from the low-pressure chamber 3 via the flow connection into the high-pressure chamber 9 by means of the pump plunger 28.

Figure 3:
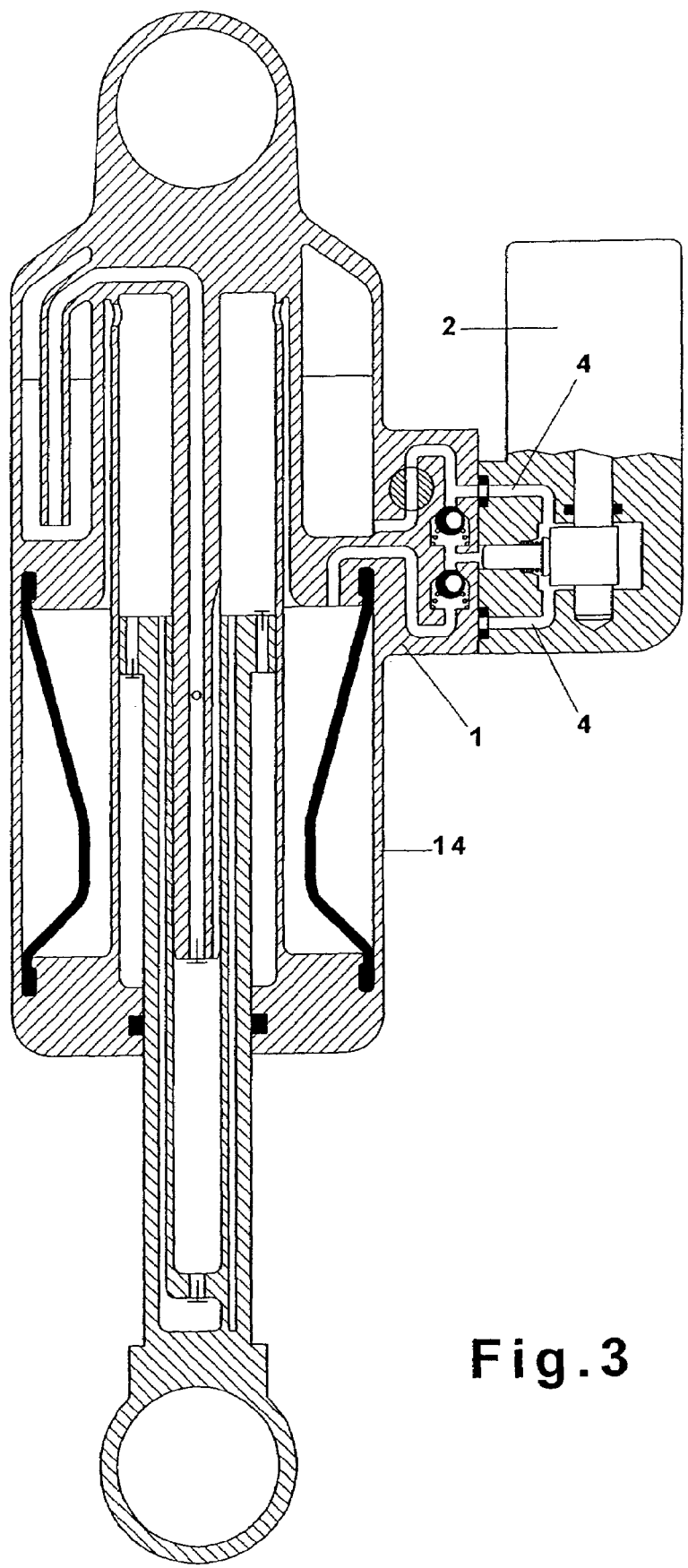
FIG. 3 shows another embodiment of the piston-cylinder unit in which the pump is installed in a different position.

FIG. 3 shows a construction which corresponds in principle to the construction shown in FIG. 2, but differs from the latter in that the pump 2 is flanged to the base 1 in the opposite direction. Due to the symmetrical configuration of the flow connections 4, it is also possible to arrange the pump 2 in this position at the base 1 of the outer tube 14.

Figure 4:
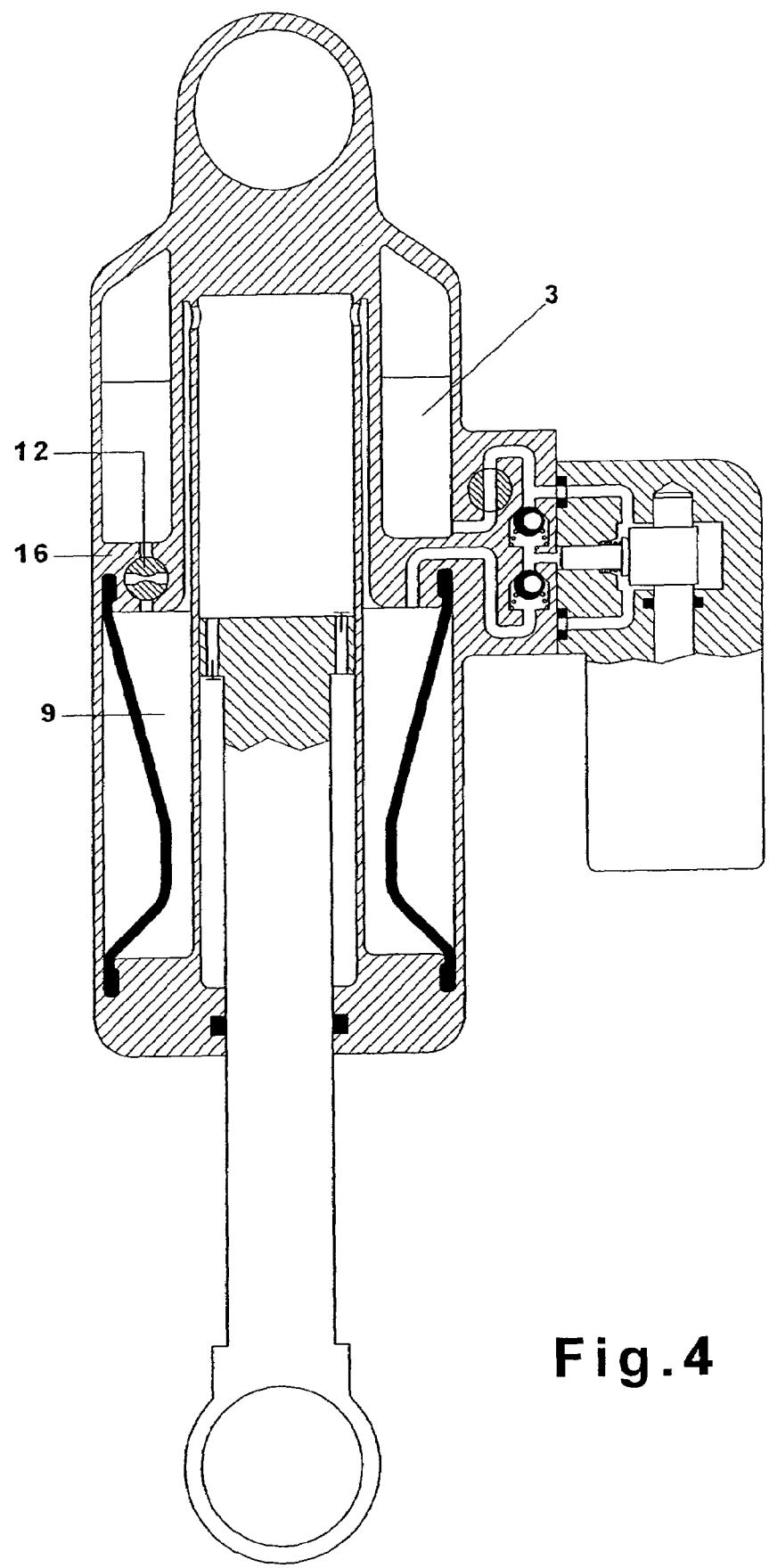
FIG. 4 is a sectional view of an embodiment in which the piston-cylinder unit is constructed as a spring cylinder.

FIG. 4 shows a spring cylinder arrangement; that is, a pump rod 23 according to FIG. 1 is not provided in this embodiment, although the operation is comparable in other respects. The spring cylinder according to FIG. 4 has no capability for adjusting the level of the vehicle body by means of a pump rod; regulation must be carried out for this purpose by means of a displacement sensor and corresponding electronics. For this reason, an outlet valve 12 is provided in element 16 for a corresponding compensation of damping medium from the low-pressure chamber to the high-pressure chamber. This embodiment has the advantage that different level positions of the vehicle body can be adjusted externally.

FIGS. 5, 5a and 5b show an embodiment in which the check valves 6 and 8 are component parts of the housing of the pump 2 and in which the base 1, which is arranged at the outer tube 14 of the piston-cylinder unit 13, is provided with a closure member 5 for each flow connection 4.

According to FIG. 5a, the pump 2 can also be arranged in the opposite direction. FIG. 5b shows a flow connection in which the closure member is constructed as a rotary slide 5 which can open or block both flow connections simultaneously.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A suspension system for a motor vehicle with level regulation for adjusting a height of a vehicle body, comprising:
   a piston-cylinder unit provided with a work cylinder, a piston rod axially movable in the work cylinder, and a damping piston connected to the piston rod;
   an arrangement of damping valves provided in the damping piston and operable during rebound and compression strokes of the damping piston;
   a high pressure chamber and a low pressure chamber which are partially filled with damping medium;
   a pump unit for pumping damping medium from the low pressure chamber to the high pressure chamber, the pump unit comprising a pump piston and a drive unit for reciprocally displacing the pump piston, the piston-cylinder unit being assembled separately from the pump unit and configured to receive damping medium prior to mounting the pump unit to the piston-cylinder unit; and
   a base on the piston-cylinder unit configured to support the pump unit and having at least one connection for conducting a flow of damping medium to or from the pump unit when the pump unit is mounted on the piston-cylinder unit, the at least one connection being open to the atmosphere when the pump unit is not mounted on the piston-cylinder unit, the base comprising blocking elements which prevent flow communication between the chambers and the at least one connection prior to mounting the pump unit on the piston-cylinder unit.

2. The suspension system of claim 1, wherein the blocking elements comprise at least one closure member and at least one check valve.

3. The suspension system of claim 1, wherein the pump unit comprises a housing having a plurality of check valves.

4. The suspension system of claim 1, wherein the piston-cylinder unit and the pump unit can be tested independently from one another.

5. The suspension system of claim 1, wherein the pump unit and the base are configured so as to selectively couple to one another in a plurality of coupling positions.

6. The suspension system of claim 1, wherein the piston-cylinder unit further comprises an outer tube spaced radially outwards from the work cylinder and comprising the base.

7. The suspension system of claim 1, wherein the at least one piston-cylinder unit further comprises:
　　an outer tube spaced radially outwards from the work cylinder;
　　an intermediate wall extending between the outer tube and the work cylinder and separating the high pressure chamber from the low pressure chamber;
　　a flow connection connecting the low pressure chamber to the pump unit.

8. The suspension system of claim 7, further comprising a flow connection through the intermediate wall connecting the pump unit to the high pressure chamber when the pump unit is mounted on the piston-cylinder unit.

* * * * *